United States Patent [19]

Takada et al.

[11] Patent Number: 4,495,794
[45] Date of Patent: Jan. 29, 1985

[54] AUTOMATIC ON-OFF VALVE FOR USE WITH A PNEUMATIC MICROMETER

[75] Inventors: Susumu Takada; Hisao Sagara, both of Soka, Japan

[73] Assignee: Huskvarna Transportkonstruktioner AB, Huskvarna, Sweden

[21] Appl. No.: 464,557

[22] Filed: Feb. 7, 1983

[30] Foreign Application Priority Data

Mar. 8, 1982 [JP] Japan ................................. 57-36093

[51] Int. Cl.³ ............................................ G01B 13/00
[52] U.S. Cl. ..................................... 73/37.5; 137/503
[58] Field of Search ............................ 73/37.5; 137/503

[56] References Cited

U.S. PATENT DOCUMENTS

| 2,192,042 | 2/1940 | Hoffman | 137/503 |
| 2,918,933 | 12/1959 | Boitnott | 137/503 |
| 2,926,523 | 1/1960 | Baker | 73/37.5 |
| 3,077,767 | 2/1963 | Ollivier | 73/37.5 |

Primary Examiner—S. Clement Swisher
Attorney, Agent, or Firm—Hubbell, Cohen, Stiefel & Gross

[57] ABSTRACT

An automatic on-off valve for use with a pneumatic micrometer connected between the main body of a pneumatic micrometer and its measuring head for economizing the consumption of pressurized air includes a valve body having, between an inlet and an exit thereof, a main flow passage to be opened and closed by a valve member and a sub-flow passage always open with a slight gap. The valve member is automatically turned on or off by the back pressure difference at the measuring head between a measuring state and a not-measuring state. The total open cross sectional area for both of the flow passages are set to be 6 to 9 times as large as the cross sectional area for a flow passage which is formed between a nozzle of the measuring head and an object to be measured upon the object being placed to measure the maximum gap, whereby a measuring error resulting from the disposition of the automatic on-off valve can be minimized within an allowable range to thereby maintain the measuring accuracy a desired high level.

2 Claims, 6 Drawing Figures

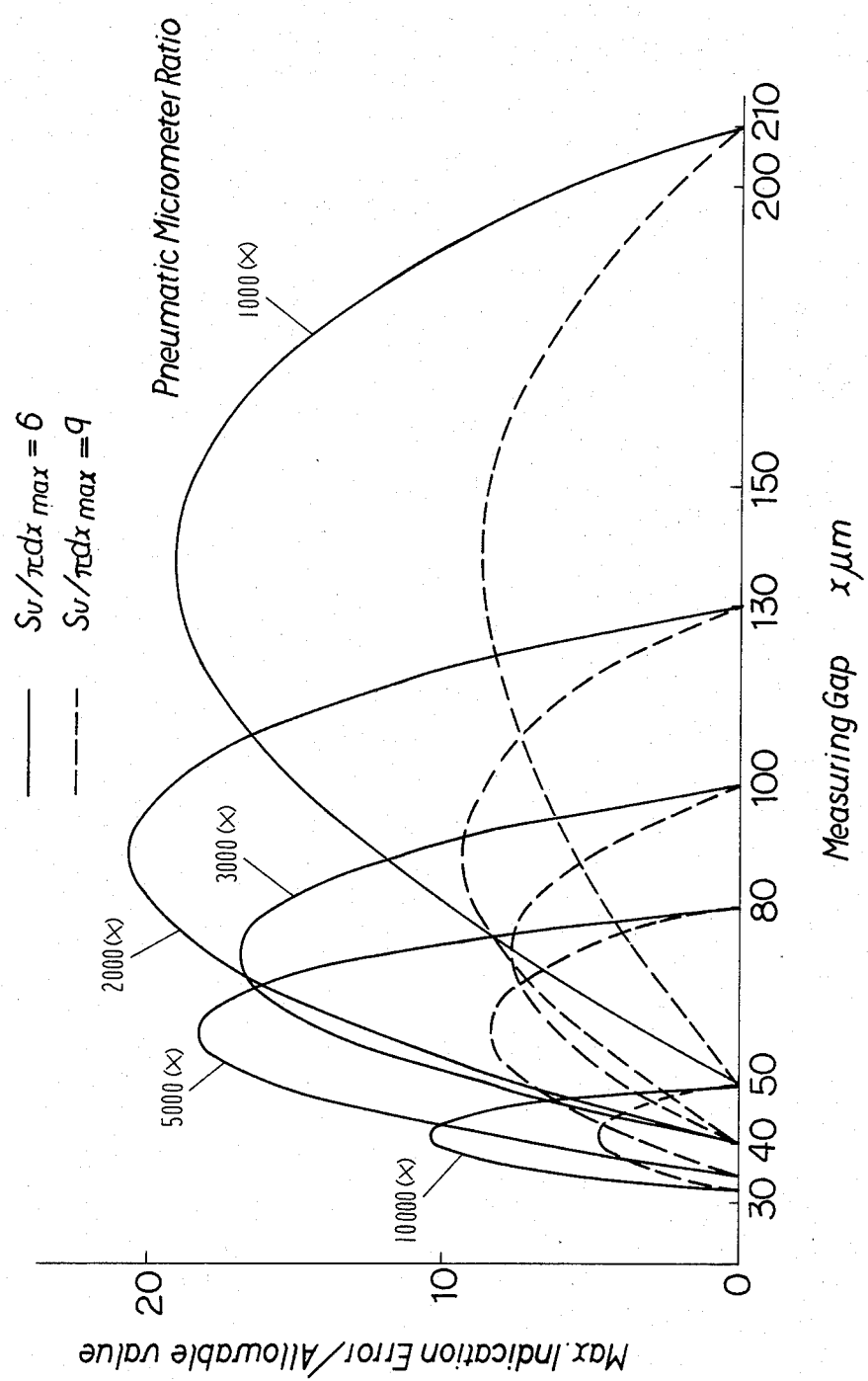

AUTOMATIC ON-OFF VALVE FOR USE WITH A PNEUMATIC MICROMETER

BACKGROUND OF THE INVENTION (1) Field of the Invention

This invention concerns an automatic on-off valve for use with a pneumatic micrometer adapted to economize the consumption of pressurized air during a not-measuring state of the micrometer.

(2) Disclosure of the Prior Art

Energy-saving measures have been taken in recent years for all of the technical fields in the industry. As for a pneumatic micrometer, for instance, pressurized air wasted in a state where no actual measurement is taken place for an object to be measured usually amount to about 50 Nl/min, which is 2-3 times as great as the air consumed in a state where measurement is actually taking place. Accordingly, various counter measures have been proposed for economizing the wasteful consumption of the pressurized air during the not-measuring state. As an example, a shut-off valve mounted on the measuring head is employed, in which the passage for flow of the pressurized air is opened during the measuring state to discharge the air for measurement and closed during the not-measuring state to interrupt the discharge of the air. Although the disposition of such a shut-off valve enables one to economize the pressurized air, it is not quite satisfactory in view of operativeness and reduced the working efficiency remarkably upon measurement due to the increase in the weight of the measuring head resulted from the attachment of the shut-off valve.

In order to overcome the foregoing problems, it may be effective to insert an automatic on-off valve between a main body of a pneumatic micrometer and its measuring head for automatically controlling the flow of pressurized air. As an example of an automatic on-off valve to attain such purpose, it can be so designed as to form two passages therein, one of which is a main flow passage to be opened and closed by a valve member to be automatically turned on or off by back pressure difference in the measuring head between the measuring state and the not-measuring state. The other passage is a sub-flow passage which is always put slightly open by means of a variable restrictor. However, the use of such an automatic on-off valve adapted as above would tend to worsen the measuring accuracy due to the error resulting from the disposition of the valve which introduces a throttling function into the measuring system.

SUMMARY OF THE INVENTION

This invention has been accomplished in view of the foregoing problems and one of the objects of this invention is to provide an automatic on-off valve for use with a pneumatic micrometer capable of minimizing an error resulted from the use of the automatic on-off valve and maintaining the measuring accuracy at a desired high level while economizing the consumption of the pressurized air.

Another object of this invention is to provide an automatic on-off valve for use with a pneumatic micrometer for enabling a stable closing action for a valve member that closes and opens a valve seat in the main flow passage of a valve body.

The foregoing objects can be attained by an automatic on-off valve for use with a pneumatic micrometer, having a valve body provided with an inlet for admitting pressurized air from a main body of a pneumatic micrometer and an outlet for supplying the pressurized air to a measuring head, a main flow passage and a sub-flow passage for communicating said inlet and said outlet with each other, said main flow passage being designed to communicate an inlet flow passage with an outlet flow passage by way of a back pressure chamber which is defined by a valve seat formed at said main flow passage and a valve member for opening and closing said valve seat, said sub-flow passage being brought said inlet flow passage into communication with said outlet flow passage by way of a by-pass flow passage which is branched from said inlet flow passage and is mounted a restrictor therein, and a spring for urging said valve member toward said valve seat which biasing force is set to such an extent as to cause said valve member to open when back pressure is exerted on said valve member from said measuring head during a measuring state and causing said valve member to close during a not-measuring state. The total open cross sectional area for said main flow passage and said sub-flow passage upon opening of the valve is set from 6 to 9 times as large as the cross sectional area for a flow passage defined by a nozzle of said measuring head and an object to be measured upon measurement of the maximum gap.

BRIEF DESCRIPTION OF THE ACCOMPANYING DRAWINGS

FIG. 6 is a graph showing the level of the error relative to the measuring gap.

DISCLOSURE OF THE PREFERRED EMBODIMENT

Figure 1:
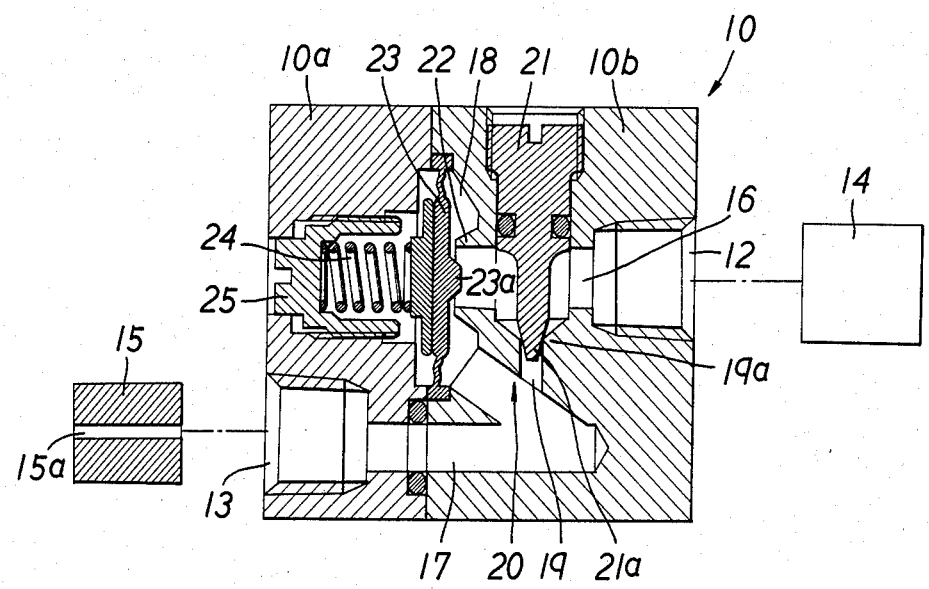
FIG. 1 is a cross sectional view for an automatic on-off valve according to this invention.

Referring to FIG. 1, a valve body 10 of an automatic on-off valve which is connected between a main body of a pneumatic micrometer and its measuring head is assembled with two component parts 10a, 10b and the body is provided with an inlet 12 for admitting pressurized air from a main body 14 of the pneumatic micrometer and an outlet 13 for supplying the pressurized air to a measuring head 15.

The inlet 12 and the outlet 13 are in communication with each other in the valve body 10 by way of a main flow passage which opens automatically only during the measuring state and also by way of a sub-flow passage which is always open. The main flow passage is composed of an inlet flow passage 16 which is communicated with the inlet 12, a back pressure chamber 18 and an outlet flow passage 17 which is connected with the outlet 13. The sub-flow passage is formed in order to bring the inlet flow passage 16 into communication with the outlet flow passage 17 by a by-pass flow passage 19 which is branched off from the inlet flow passage 16. The by-pass flow passage 19 is provided with a variable restrictor 20, the restrictor 20 being composed of a valve seat 19a which is formed at the midway of the by-pass flow passage 19 and a needle 21a of an adjusting screw 21 which is threaded into the valve body 10 so as to facilitate the opening degree of the valve seat 19a. The adjusting screw 21 and its needle 21a do not interfere with the flow from the inlet flow passage 16 to the back pressure chamber 18.

The back pressure chamber 18 is provided with a valve seat 22 formed at the downstream end of the inlet flow passage 16 and with a diaphragm valve member 23 acting to open and close the valve seat 22. A spring 24 which urges the valve member 23 toward the valve seat 22 is mounted in a compressed manner between the back face of the valve member 23 and a spring seat 25 retractably threaded into the valve body 10. The valve member 23 is formed, on the side of the valve seat 22, with a frust-conical protrusion 23a that fits into the valve seat 22. The biasing force of the spring 24 is set such that it closes the valve seat 22 during the not-measuring state where the back pressure present at the measuring head 15 is low and allows the valve seat 22 to open during the measuring state where the back pressure is increased. Specifically, the spring biasing force is set so as to satisfy the relationship:

$$p_0 > f_0 > p_x$$

where $f_0$ is an initial biasing force of the spring 24 converted into the value of pressure, $p_0$ is a back pressure exerted on the valve member 23 in the back pressure chamber 18 during the not-measuring state and $p_x$ is the back pressre during the measuring state.

The provision of such an automatic on-off valve to the pneumatic micrometer, however, may cause a measuring error since the automatic on-off valve is throttling the flow of the air. Accordingly, in order to minimize such a measuring error within an actually allowable range and maintain the measuring accuracy to a required level, the total open cross sectional area for the valve seat 22 in the main flow passage and for the restrictor 20 in the sub-flow passage is set from 6 to 9 times as large as the cross sectional area for a flow passage defined with a measuring nozzle 15a of the measuring head 15 and an object to be measured upon measurement of the maximum gap in the automatic on-off valve according to this embodiment.

Figure 2:
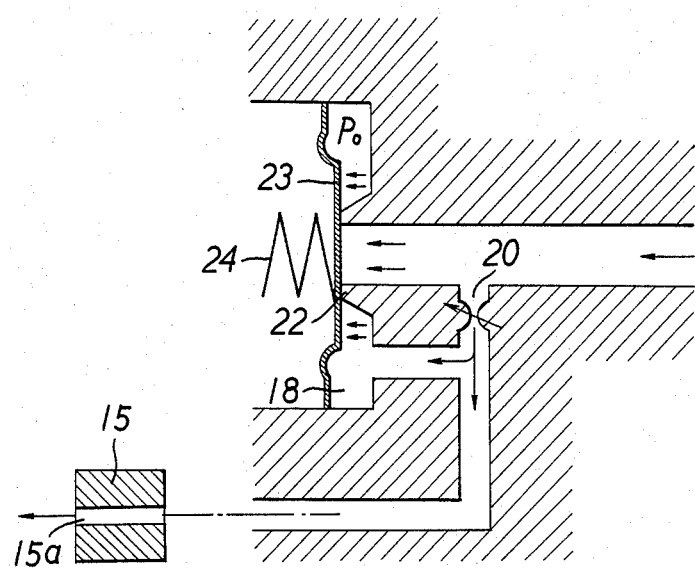
FIG. 2 and FIG. 3 are cross sectional views schematically showing the main parts of the automatic on-off valve shown in FIG. 1, during measuring state and not-measuring state respectively.
Figure 3:
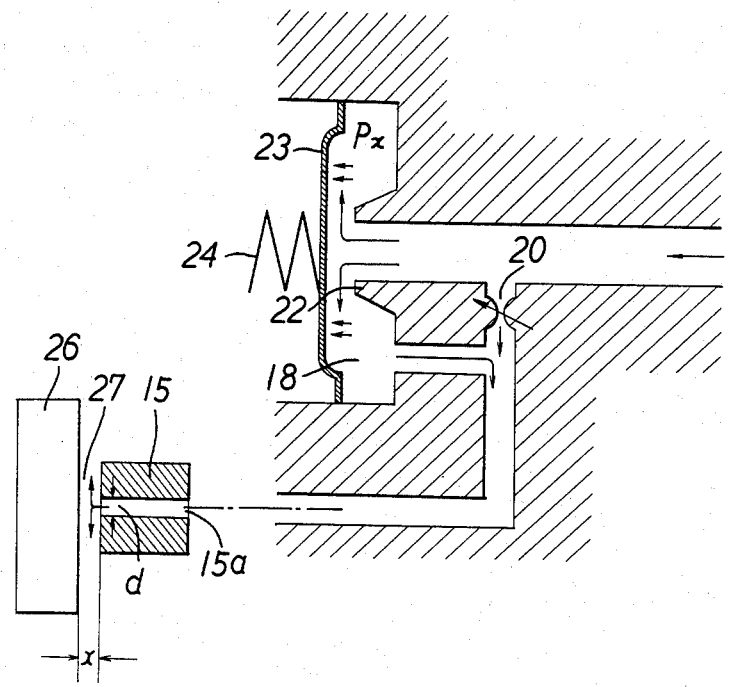

Explanation will now be made for the operation of the automatic on-off valve having the foregoing elements. FIG. 2 and FIG. 3 schematically illustrate the main components of the automatic on-off valve shown in FIG. 1 for the better understanding of the operation of the automatic on-off valve, in which FIG. 2 shows the not measuring state and the FIG. 3 shows the measuring state.

During the not-measuring state shown in FIG. 2, since the back pressure at the measuring head 15 is low, the back pressure $p_0$ exerted on the valve member 23 in the back pressure chamber 18 is smaller than the biasing force $f_0$ of the spring 24 and, therefore, the valve member 23 abuts against and closes the valve seat 22. Accordingly, in the not-measuring state, a discharge of the pressurized air from the measuring head 15 is a small amount which is supplied only by the variable restrictor 20 in the sub-flow passage.

During the measuring state shown in FIG. 3, where the measuring nozzle 15a is brought closer to an object to be measured 26 for measuring a gap x, since the gap x is as small as from several tens to several hundreds of μm, the back pressure at the measuring head 15 is increased and the back pressure $p_x$ exerted on the valve member 23 in the back pressure chamber 18 overcomes the biasing force $f_0$ of spring 24. As the result, the valve member 23 retracts to open the valve seat 22 and the pressurized air flows to the measuring head 15 by way of both of the valve seat 22 and the variable restrictor 20.

The open cross sectional area $Sv_{min}$ for the variable restrictor 20 is usually set to the following range:

$$Sv_{min} \approx \pi d x_{min} \sim \pi d x_{max}$$

where $x_{min}$ is the minimum measuring gap, $x_{max}$ is the maximum measuring gap and d is the diameter for the nozzle of the measuring head 15. This means that the cross sectional area $Sv_{min}$ is set within the range of a cross sectional area for the flow passage 27 formed between the measuring head 15 and the object 26 upon measurement. Accordingly, the air flow rate during the not-measuring state is restricted so as to be extremely small by the variable restrictor 20, which is decreased significantly as compared with a case where such flow rate restriction is not created by the variable restrictor 20 (in the case where the automatic on-off valve is not used). That is, the air flow rate during the measuring state, where the flow rate has no restriction by the variable restrictor, is determined by the cross sectional area for the nozzle 15a ($=\pi/4 d^2$, in the case of the circular aperture) of the measuring head 15 and, accordingly, the air flow rate can be economized by the provision of the variable restrictor 20 by such an extent:

$$\frac{Sv_{min}}{\frac{\pi}{4} d^2} = \frac{4 x_{min}}{d} \sim \frac{4 x_{max}}{d}$$

The economizing ratio for the air flow rate is calculated for the minimum measuring gap $x_{min}$ and the maximum measuring gap $x_{max}$ for each magnifying rate of the pneumatic micrometer as specified in Japanese Industrial Standards (JIS), with respect to a nozzle diameter d of 2 mm which is specified also in JIS. The calculation results are shown in Table 1. The results of the calculation were also confirmed by the actual experiment carried out by the present inventors.

TABLE 1

| Pneumatic micrometer magnifying ratio | Minimum measuring gap $x_{min}$ | Maximum measuring gap $x_{max}$ | Flow rate economizing ratio |
|---|---|---|---|
| 1000 (x) | 50 μm | 210 μm | 0.1–0.42 |
| 2000 (x) | 40 μm | 130 μm | 0.08–0.26 |
| 3000 (x) | 40 μm | 100 μm | 0.08–0.2 |
| 5000 (x) | 35 μm | 60 μm | 0.07–0.16 |
| 10000 (x) | 32 μm | 50 μm | 0.064–0.1 |

As described previously, since the flow rate during the not-measuring state where the flow rate of the pressurized air is not restricted from the variable restrictor usually amounts to 50–60 Nl/min, the economizing effect obtained by this invention is very much remarkable.

Further, since the flow rate of the pressurized air passing through the variable restrictor 20 is kept within a range of the flow rate of the pressurized air flowing through the flow passage 27 formed between the measuring head 15 and the object to be measured 26 during the measuring state, by setting the open cross sectional area $Sv_{min}$ for the variable restrictor 20 within a range between $\pi dx_{min} - \pi dx_{max}$, an indicating float in the main body 14 of the pneumatic micrometer can be operated during the not-measuring state in the same manner as that during the measuring state and, accordingly, the variable restrictor 20 can be adjusted properly while observing the float.

Figure 4:
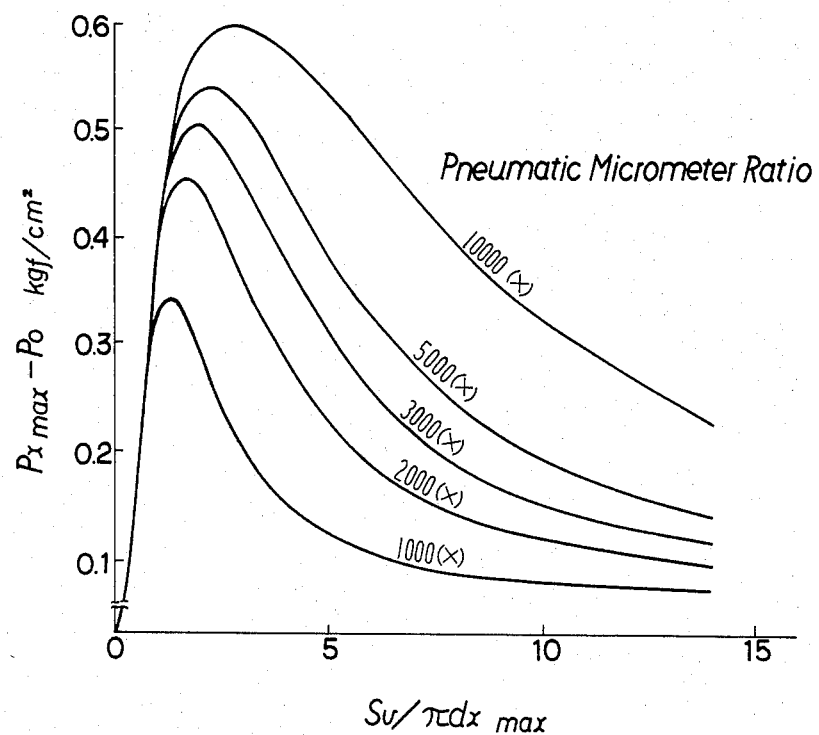
FIG. 4 is a characteristic chart showing the difference in the back pressures at the measuring head between the measuring state and the not-measuring state.

FIG. 4 is a graph with an equi-pitch scale showing the releationship of the ratio $Sv/\pi dx_{max}$ between the total open cross sectional area Sv for the valve seat 22 in the main flow passage and for the variable restrictor 20 in the sub-flow passage of the automatic on-off valve and the open cross sectional area $\pi dx_{max}$ for the flow passage 27 upon measurement of the maximum gap $x_{max}$, versus the difference $px_{max} - p_0$ between the back pressure $px_{max}$ upon measurement of the maximum gap $x_{max}$ and the back pressure $p_0$ during the not measuring state, with respect to each of the magnifying ratios of the pneumatic micrometer. The value for the difference $px_{max} - p_0$ takes an extreme point about at 1-3 time the ratio $Sv/\pi dx_{max}$ and, gradually, decreases as the ratio $Sv/\pi dx_{max}$ increases. The maximum gap $x_{max}$ is chosen here, because it results in the minimum throttling effect within the measuring range and the back pressure px is the lowest in the measuring range.

In order to attain the stable operation of the valve member 23, based on the relationship: $p_0 < f_0 < p_x$ as described above, it is better to increase the difference between the back pressure $p_x$ during the measuring state and the back pressure $p_0$ during the not-measuring state. Accordingly, it is advantageous, in view of FIG. 4, to set the value $Sv/\pi dx_{max}$ close to the range of 1-3. However, by the disposition of the automatic on-off valve, it is equivalent to the introduction of a restrictor which has the open cross sectional Sv into the measurimg system as described above, which causes an error to worsen the measuring accuracy of the pneumatic micrometer.

Figure 5:
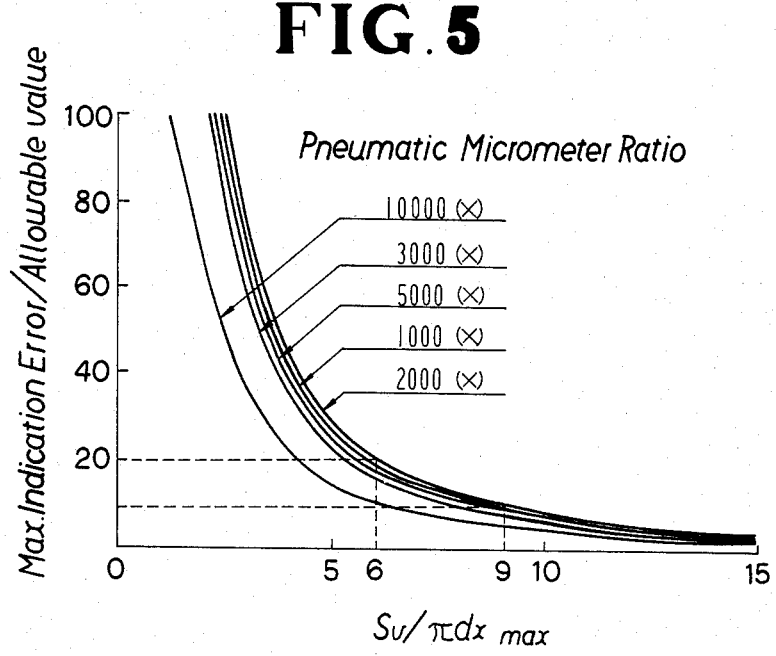
FIG. 5 is a graph showing the level of an error introduced by the use of the automatic on-off valve.

FIG. 5 shows the level of the error by introducing the disposition of the automatic on-off valve as a relationship between the maximum indication error/allowable value during the measuring state and the ratio $Sv/\pi dx_{max}$. Table 2 shows the values used for the allowable values determined according to JIS.

TABLE 2

| Pneumatic micrometer ratio (x) | 1000 | 2000 | 3000 | 5000 | 10000 |
|---|---|---|---|---|---|
| Allowable value (μm) | 4 | 2 | 1.5 | 1 | 0.5 |

It can be seen from FIG. 5 that a greater total open cross sectional area Sv for the automatic on-off valve during the measuring state is better in order to decrease the error. However, taking into consideration that the greater majority of the measurement are conducted with the pneumatic micrometers in order to compare with a settled reference dimension, it is most suitable to take a value for the ratio $Sv/\pi dx_{max}$ within a range from 6 to 9 as the operation conditions that renders the ratio of maximum indication error/allowable value to 10-20%.

FIG. 6 shows the relationships between the measuring gap and the indication error/allowable value for the case where the ratio $Sv/\pi dx_{max}$ is set to 6 and 9 respectively for each of the magnifying ratios of pneumatic micrometers. Respective curves exhibit convexed trends since the error resulted from disposition of the automatic on-off valve is compensated at the maximum and minimum measuring gaps by the adjustability of the micrometer and the error relative to the measuring gap is maximum about at a middle position. As can be seen from FIG. 6, the error resulting from the disposition of the automatic on-off valve becomes extremely small upon measurement of the limit value in the comparative judgment since the error close to the limit value is decreased. Referring further to the measuring range, the ratio of the error relative to the measuring range is at most about 0.5%, whereby it provides an extremely high practical merit, when the air economizing effect is considered in connection.

Furthermore, the protrusion 23a provided from the valve member 23 is gradually fitted deeply into the valve seat 22 in the valve closing step to accelerate the throttling effect in the main flow passage and rapidly increase the valve closing force, thereby to ensure stable valve closing action. It is a mattter of fact that the projection 23a should be provided on the valve member 23 so as to satisfy the total open cross sectional area Sv for the main passage and the sub-flow passage as described above.

According to the automatic on-off valve as stated above specifically, since the total open cross sectional area Sv for the valve seat 22 and for the variable restrictor 20 upon valve opening is set to 6-9 times as large as the cross sectional area for the flow passage defined by the nozzle 15a of the measuring head and the object to be measured 26 upon measurement of the maximum gap, the error resulted from the disposition of the automatic on-off valve can be minimized within an actually allowable range while maintaining the measurring accuracy at a desired high level.

What is claimed is:

1. An automatic on-off valve for use with a pneumatic micrometer, comprising:
   a valve body provided with an inlet for admitting pressurized air from a main body of a pneumatic micrometer and an outlet for supplying the pressurized air to a measuring head;
   a main flow passage and a sub-flow passage, respectively, for providing communication between said inlet and said outlet, said main flow passage having an inlet flow passage and an outlet flow passage which communicate with one another by way of a back pressure chamber which is defined by a valve seat provided in said inlet flow passage and a valve member for opening and closing said valve seat, said sub-flow passage having a by-pass flow passage including a flow restrictor said by-pass flow passage branching from said inlet flow passage for providing continuous communication between said inlet and outlet flow passages,
   a spring for biasing said valve member toward said valve seat, said spring having a biasing force sufficient to permit said valve member to open due to back pressure exerted on said valve member from said measuring head only during a measuring state and to cause said valve member to close during a not-measuring state;
   a frusto-conical protrusion on said valve member at a position wherein said protrusion throttles said main flow passage during valve closing and accelerates closure of said valve member, wherein said flow restrictor is a variable flow restrictor including an adjustment screw adjustable from outside of said valve body, said adjustment screw having a needle for operating with a needle seat in said by-pass passage, the total open cross sectional area for said valve seat of said main flow passage and said flow restrictor of said sub-flow passage is set to be 6 to 9 times as large as the cross sectional area for a flow passage defined between a nozzle of said measuring head and an object to be measured upon measurement of a maximum gap.

2. The automatic on-off valve for use with a pneumatic micrometer as defined in claim 1, wherein one end of said spring for biasing said valve member toward said valve seat is supported by a spring seat which is adjustably threaded from the outside of said valve body.

* * * * *

UNITED STATES PATENT AND TRADEMARK OFFICE
CERTIFICATE OF CORRECTION

PATENT NO. : 4,495,794

DATED : January 29, 1985

INVENTOR(S) : Takada et al.

It is certified that error appears in the above-identified patent and that said Letters Patent is hereby corrected as shown below:

On the title page, Item (73) should read

--[73] Assignee: SHOKETSU KINZOKU KOGYO KABUSHIKI KAISHA, Tokyo, JAPAN

Attorney, Agent, or Firm--OBLON, FISHER, SPIVAK, McCLELLAND & MAIER, P.C. --

Signed and Sealed this

Twenty-second Day of October 1985

[SEAL]

*Attest:*

DONALD J. QUIGG

*Attesting Officer*

*Commissioner of Patents and Trademarks—Designate*